UNITED STATES PATENT OFFICE.

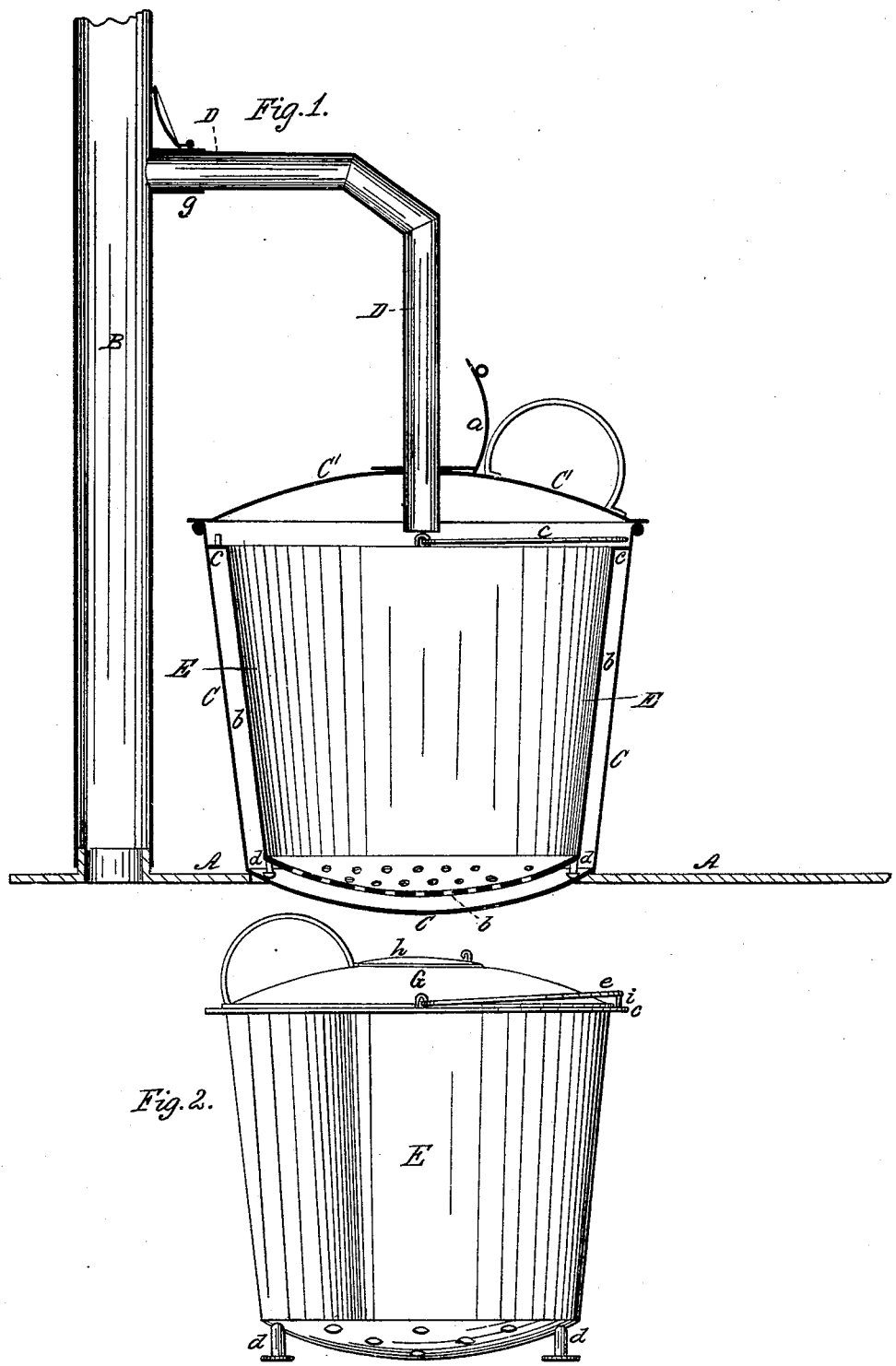

CLARISSA BRITAIN, OF ST. JOSEPH, MICHIGAN.

IMPROVEMENT IN BOILERS.

Specification forming part of Letters Patent No. 40,157, dated October 6, 1863.

*To all whom it may concern:*

Be it known that I, CLARISSA BRITAIN, of St. Joseph, in the county of Berrien and State of Michigan, have invented a new and Improved Potato-Boiler; and I do hereby declare that the following is a full, clear, and exact description thereof, reference being had to the accompanying drawings, making a part of this specification, in which—

Figure 1 is a vertical central section through my boiler, showing the same arranged on top of a stove and connected with the stove pipe by means of a steam-escape pipe. Fig. 2 is a side elevation of the interior bucket with removable lid and perforated bottom.

Similar letters of reference indicate corresponding parts in both figures.

This invention relates to a new and improved apparatus intended for boiling potatoes, although it may be used for boiling other like vegetables, the object of which is to obviate the difficulties attending the boiling of vegetables, especially of potatoes, which require to be removed from the boiling water as soon as they are properly cooked, otherwise they become "water-soaked," and unfit for table use.

In the improved apparatus which I am about to describe provision is made for conducting the steam which rises from the boiler out of the room; also, for removing the boiling water from the potatoes without liability of burning the hand; and, finally, for drying the potatoes after they are cooked without removing them from the vessel in which they were boiled, all of which is effected by a very simple apparatus, as will be hereinafter described.

To enable others skilled in the art to make and use my invention, I will proceed to describe its construction and operation.

In the accompanying drawings, A represents the top plate of an ordinary stove, and B the stove-pipe, through which the products of combustion escape from the stove into the chimney. In any one of the holes through the stove-plate A a kettle, C, having a convex bottom, is placed, as shown in Fig. 1. This kettle is provided with a bail, (not shown in the drawings,) and also a cover, C', fitting closely down on the top of the kettle, which cover has a hole through its top for receiving the lower end of a pipe, D, and when this pipe is removed the secondary cover a is used to close this hole. This cover C' is also provided with a looped handle, by which it can be removed from the kettle or replaced at pleasure. The size of this kettle C should be such as to contain another kettle, E, of a similar shape, leaving a space, b, between the two kettles. This inner kettle, E, has a flange, c, projecting from its upper edge outward for keeping it in the center of the outer kettle when placed therein, and the legs d d d, projecting from this kettle E, serve as supports for it while in the outer kettle or boiler, as well as when it is removed from this boiler and rested upon the stove-plate A. These legs also serve another purpose, as will be hereinafter described. The outer kettle or boiler, C, is made of iron, such as is commonly used for boiling potatoes, and the inner kettle may be made of tin or other thin sheet-metal. The bottom of this latter kettle is perforated, as shown in Figs. 1 and 2, to obviate the difficult process of pouring boiling water off from the potatoes, and its top is provided with a bail, e, by means of which the kettle may be lifted out of kettle C, or introduced therein at pleasure. This bail is shown clearly in Fig. 2, resting upon a projection, i, which is intended to prevent the bail from falling below the upper edge or rim of the kettle.

In Fig. 1 the kettles C E are represented in connection with their appendages, ready for receiving the potatoes for boiling. The inner kettle having been introduced into the outer one, potatoes are put into the inner kettle E and covered with water, which rises to the same height in both kettles. The cover C' is put on the outer kettle, and the pipe D introduced through the opening in the center of this cover. The upper end of the pipe D is attached to the short tube g of pipe B, and a communication is thus formed between the pipe B and the interior of the kettles for the escape of steam and noxious vapors rising from the boiling potatoes. When the potatoes are properly boiled, the cover C' is removed, and the inner kettle E is covered by the lid G, (shown in Fig. 2,) which prevents the steam from escaping, and allows this latter kettle to be lifted up, and its bottom rests upon the edge of kettle C, in order to drain off the water from the potatoes. When the kettle is in this position, one of the legs d catches on the edge of the outer kettle and prevents the kettle E from slipping back into C again. When drained, the kettle E may be set on the top of the stove and the small hinged lid $h$ of the cover G opened to allow the steam to escape, then closed to keep the potatoes warm any length of time required.

From this description it will be seen that the hitherto difficult operation of boiling potatoes is rendered very simple, and that there is no liability of burning the hands by steam in removing the potatoes from the boiling water, as the vessel containing them is covered, when it is removed and the water allowed to escape through the perforated bottom of the inner kettle. During the operation of boiling all the steam is conducted off into the smoke-pipe, thus avoiding disagreeable heat and odors in the kitchen, which would arise from the escape of steam.

By using the steam-pipe in the manner described it will not be necessary to construct the kettles especially for it, a hole through the cover of the kettle being all that is required to adapt the pipe to it, and when this steam-pipe is not in immediate use it may be removed and hung up in an out-of-the-way place and the hole in the stove-pipe closed by a hinged cover, as shown in Fig. 1.

I do not claim that I am the first inventor of a boiler having a steam-pipe connected to it leading into the common flue of the stove for carrying off the steam from said boiler, for this has been done in a variety of boiling apparatuses; but I have invented a new apparatus, of which a steam-pipe is one of the elements which enters into the combination to form a perfect potato-boiler. I apply this steam-pipe to the top of my boiler in such a manner that it can be readily removed therefrom, or replaced at pleasure; and in order to do this conveniently, I form an opening through the center of the boiler-cover, which opening it is necessary to close when the steam-pipe is not in immediate use, or when the boiler is used for other purposes. I therefore apply a secondary cover or lid to the large one for closing the hole through it. Again, it is desired to obtain a boiler having an interior kettle arranged within it, the bottom of which is perforated in order to allow the water which is put into this interior kettle to rise within the space between the two kettles to the same height as that in the perforated kettle, and also to allow the water which is in this latter kettle to escape, when the kettle is lifted up, thus obviating the necessity of pouring off boiling water from the potatoes in the usual manner—an operation always attended with danger of burning the hands; and, finally, I have applied hooked or flanged legs to the bottom of the inner kettle for the purpose of keeping the perforated bottom thereof above the bottom of the outer kettle, leaving a space between the two kettles. These legs also serve as a means for holding the bottom of the smaller kettle in place on the top of the larger one while draining the potatoes. All of which parts go to form a new and useful potato-boiler, and one which provides for all the requirements of the operation by conducting off noxious vapors, separating the potatoes from the boiling water after they are cooked, preventing liability of burning the hands in the operation, drying the potatoes and, finally, keeping them warm until they are ready for use. All of these advantages I obtain by the application of certain parts to a common covered kettle, such as is generally used about a stove for a variety of purposes. Said parts being so constructed and applied to such a kettle that its utility for other purposes than that of boiling potatoes is in no wise impaired. It will therefore be seen that I do not claim the steam-pipe when separately considered. It is only the combination and adaptation of such a pipe to the common form of boiler and the means by which I am enabled to practically employ such a pipe for use in the kitchen that I regard as new, so far as the steam-pipe is concerned.

Having thus described my invention, what I claim as new, and desire to secure by Letters Patent, is—

1. The ordinary form of inner kettle, E, when constructed with a perforated bottom, flange-rim, C, a closely-fitting but removable cover, G, and steam lid $h$, as an auxiliary to a potato-boiling kettle, C, substantially as and for the purposes described.

2. Combining with the two kettles C and E, constructed substantially as set forth, the removable steam-escape pipe D, cover C′, and lid $a$, arranged and operating substantially as described.

3. Providing the kettle E with hooked legs $d$, for the purpose described.

Witness my hand in the matter of my application for a patent for improved culinary apparatus.

CLARISSA BRITAIN.

Witnesses:
FRED. A. POTTER,
A. P. AUSTEN.